(12) United States Patent
Kuang

(10) Patent No.: US 11,441,649 B2
(45) Date of Patent: Sep. 13, 2022

(54) ECCENTRIC GEAR STRUCTURE

(71) Applicant: GUANGZHOU ANTU ELECTRIC CO., LTD., Guangdong (CN)

(72) Inventor: Xinhua Kuang, Guangdong (CN)

(73) Assignee: GUANGZHOU ANTU ELECTRIC CO., LTD., Guangzhou (CN)

( * ) Notice: Subject to any disclaimer, the term of this patent is extended or adjusted under 35 U.S.C. 154(b) by 326 days.

(21) Appl. No.: 16/686,270

(22) Filed: Nov. 18, 2019

(65) Prior Publication Data
US 2021/0095747 A1    Apr. 1, 2021

(30) Foreign Application Priority Data
Sep. 30, 2019 (CN) .......................... 201921662842.8

(51) Int. Cl.
*F16H 35/00*    (2006.01)

(52) U.S. Cl.
CPC ....... *F16H 35/00* (2013.01); *F16H 2035/001* (2013.01)

(58) Field of Classification Search
CPC .... F16H 21/18; F16H 35/00; F16H 2035/001; F16H 55/12; F04B 35/01; F04B 35/04; F16C 3/20; F16C 3/22
USPC ................................................... 74/451, 665
See application file for complete search history.

(56) References Cited

U.S. PATENT DOCUMENTS

| | | | | |
|---|---|---|---|---|
| 5,215,447 A * | 6/1993 | Wen | .......................... | F04B 9/06 417/319 |
| 6,095,758 A * | 8/2000 | Chou | ....................... | F04B 35/04 417/374 |
| 6,135,725 A * | 10/2000 | Chou | ....................... | F04B 35/04 417/360 |
| 6,146,112 A * | 11/2000 | Chou | ....................... | F04B 9/045 417/360 |
| 6,200,110 B1 * | 3/2001 | Chou | ....................... | F04B 35/04 417/415 |
| 6,213,725 B1 * | 4/2001 | Chou | ....................... | F04B 35/04 417/415 |
| 6,280,163 B1 * | 8/2001 | Chou | ....................... | F04B 35/01 417/360 |
| 6,315,534 B1 * | 11/2001 | Chou | ....................... | F04B 35/04 417/360 |

(Continued)

FOREIGN PATENT DOCUMENTS

CN    201554617 U  *  8/2010
CN    108223551 A  *  6/2018

OTHER PUBLICATIONS

CN 201554617 U (Xinhua Kuang) Aug. 18, 2010. [online] [retrieved on Dec. 6, 2021], Retrieved from: Proquest Dialog. (Year: 2010).*

*Primary Examiner* — Joseph Brown

(57) ABSTRACT

An eccentric gear structure includes a gear block and an eccentric block embedded into the gear block; the gear block is provided with an accommodating cavity suitable for embedment of the eccentric block, the eccentric block is provided with a first through hole and a second through hole that deviates from the first through hole; an embedding hole is provided at an axis of the gear block, and an axis of the first through hole coincides with an axis of the embedding hole. The eccentric gear structure ensures the quality of the product through the embedded structure.

8 Claims, 3 Drawing Sheets

(56) References Cited

U.S. PATENT DOCUMENTS

| | | | | |
|---|---|---|---|---|
| 6,655,928 B2* | 12/2003 | Chou | ...................... | F04B 35/00 |
| | | | | 417/360 |
| 7,273,358 B2* | 9/2007 | Wang | ...................... | F04B 35/04 |
| | | | | 417/360 |
| 7,462,018 B2* | 12/2008 | Chou | ...................... | F04B 35/04 |
| | | | | 417/415 |
| 9,759,207 B2* | 9/2017 | Chou | ...................... | F04B 35/04 |
| 9,803,632 B2* | 10/2017 | Chou | ...................... | F04B 53/10 |
| 9,945,369 B2* | 4/2018 | Chou | .................. | F04B 39/0022 |
| 11,125,222 B2* | 9/2021 | Chou | ...................... | F16H 21/18 |
| 2002/0141890 A1* | 10/2002 | Chou | ...................... | F04B 35/01 |
| | | | | 417/415 |
| 2002/0178907 A1* | 12/2002 | Chou | ...................... | F04B 35/01 |
| | | | | 92/140 |
| 2004/0105766 A1* | 6/2004 | Chou | ...................... | F04B 35/00 |
| | | | | 417/415 |
| 2005/0191193 A1* | 9/2005 | Chou | ...................... | F04B 35/04 |
| | | | | 417/437 |
| 2007/0264139 A1* | 11/2007 | Chou | .................. | F04B 39/0094 |
| | | | | 417/415 |
| 2015/0059507 A1* | 3/2015 | Hong | ...................... | F16H 55/17 |
| | | | | 74/433.5 |
| 2015/0285236 A1* | 10/2015 | Chou | ...................... | F04B 39/121 |
| | | | | 417/415 |
| 2015/0300342 A1* | 10/2015 | Chou | ...................... | F04B 39/121 |
| | | | | 417/374 |
| 2015/0300343 A1* | 10/2015 | Chou | ...................... | F04B 41/02 |
| | | | | 417/374 |
| 2015/0330379 A1* | 11/2015 | Chou | ...................... | F16F 15/262 |
| | | | | 417/374 |
| 2016/0097379 A1* | 4/2016 | Chou | ...................... | F04B 39/10 |
| | | | | 417/374 |
| 2016/0097383 A1* | 4/2016 | Chou | ...................... | F04B 53/14 |
| | | | | 417/63 |
| 2016/0102661 A1* | 4/2016 | Chou | ...................... | F04B 35/06 |
| | | | | 417/559 |
| 2019/0162174 A1* | 5/2019 | Chou | .................. | F04B 39/0094 |
| 2019/0170192 A1* | 6/2019 | Chou | ...................... | F04B 39/14 |
| 2020/0102953 A1* | 4/2020 | Chou | ...................... | F04B 39/14 |

* cited by examiner

ECCENTRIC GEAR STRUCTURE

CROSS REFERENCE TO RELATED APPLICATIONS

The present application claims the benefit of Chinese Patent Application No. 201921662842.8 filed on Sep. 30, 2019, the contents of which are incorporated herein by reference in their entirety.

FIELD OF THE APPLICATION

The application relates to an eccentric gear structure.

BACKGROUND OF THE APPLICATION

At present, a shortcoming of the existing technology is using a co-injection production process. It is well known that the co-injection production process is relatively troublesome, it is necessary to manually place an eccentric gyro, so that the production efficiency is low, the defect rate is also high, and there is a certain danger to the production workers. A production worker needs to operate in an injection molding machine when placing co-injection parts into the injection molding machine. The product yield will also affect the quality of the production due to placement of the co-injection parts, and there is a certain possibility of damage to the molds.

SUMMARY OF THE APPLICATION

An objective of the application is to provide an eccentric gear structure which ensures the quality of the product through a embedded structure.

In order to achieve the aforementioned objective, the application provides an eccentric gear structure comprising a gear block and an eccentric block embedded into the gear block; wherein, the gear block is provided with an accommodating cavity suitable for embedment of the eccentric block, the eccentric block is provided with a first through hole and a second through hole that deviates from the first through hole; an embedding hole is provided at an axis of the gear block, and an axis of the first through hole coincides with an axis of the embedding hole.

In the above eccentric gear structure, the eccentric block has a fan-like shape, the axis of the first through hole coincides with an axis of a central angle of the eccentric block, and the second through hole is disposed on a position away from an arc surface of the fan-like shape.

In the above eccentric gear structure, the eccentric block is fixed within the accommodating cavity by rivets.

In the above eccentric gear structure, the receiving cavity has a depth of 6 to 7 mm.

In the above eccentric gear structure, a thickness of the eccentric block is 2 to 3 mm greater than the depth of the accommodating cavity.

In the above eccentric gear structure, a side of the embedding hole away from the accommodating cavity is provided with a boss.

In the above eccentric gear structure, a side of the second through hole away from the accommodating cavity is provided with a boss.

In the above eccentric gear structure, a distance between the axis of the first through hole and an axis of the second through hole is in a range of 7 to 9 mm.

In the above eccentric gear structure, the gear block is made of plastic.

In the above eccentric gear structure, a contour of the accommodating cavity is the same as an outer contour of the eccentric block.

The eccentric gear structure provided in the above technical solution has the following beneficial effects, compared with the prior art: the eccentric rotation function of the gear block is realized by embedding the eccentric block into the accommodating cavity of the gear block, the rotation of the eccentric block and the gear block is realized by the first through hole and the embedding hole, and the eccentric block drives the second through hole to realize the eccentric movement of the second through hole with respect to the axis of the gear block; separately moulding and embedding the gear block and the eccentric block, which is different from the two-casting process in the prior art, can ensure the quality process of each accessory, and installation of the gear block 1 and the eccentric block 2 is more convenient than that obtained from the two-casting process, which ensures the quality of the eccentric gear structure.

In drawings, 1: gear block, 11: accommodating cavity, 12: embedding hole, 2: eccentric block, 21: first through hole, 22: second through hole, 3: boss, 4: rivet.

DETAILED DESCRIPTION OF PREFERRED EMBODIMENTS

The specific implementations of the application are further described in detail below with reference to the drawings and embodiments. The following embodiments are intended to illustrate the application, but are not intended to limit the scope of the application.

Figure 1:
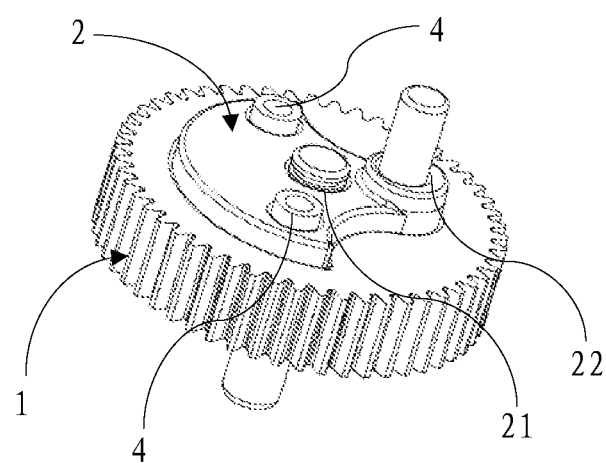
FIG. 1 is a schematic structural view of an eccentric gear structure of the application.
Figure 2:
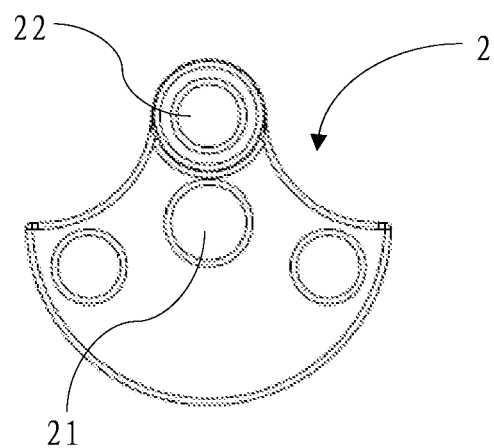
FIG. 2 is a schematic structural view of an eccentric block of the application.
Figure 3:
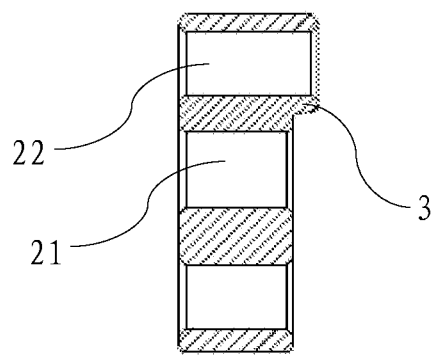
FIG. 3 is a cross-sectional view of a gear block of the application.
Figure 4:
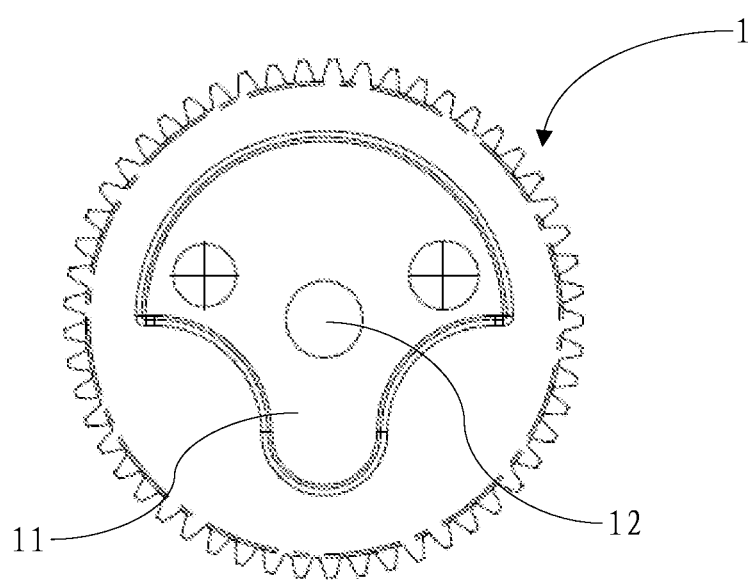
FIG. 4 is a schematic structural view of a gear block of the application.
Figure 5:
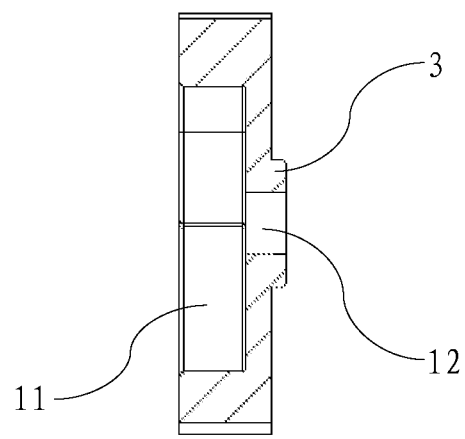
FIG. 5 is a cross-sectional view of a gear block of the application.

Refer to FIGS. 1 to 5, an eccentric gear structure provided in the application comprises a gear block 1 and an eccentric block 2 embedded into the gear block 1; the gear block 1 is provided with an accommodating cavity 11 suitable for embedment of the eccentric block 2, the eccentric block 2 is provided with a first through hole 21 and a second through hole 22 that deviates from the first through hole; an embedding hole 12 is provided at an axis of the gear block 1, and an axis of the first through hole 21 coincides with an axis of the embedding hole 12.

According to the aforementioned technical features, the eccentric rotation function of the gear block 1 is realized by embedding the eccentric block 2 into the accommodating cavity 11 of the gear block 1, the rotation of the eccentric block 2 and the gear block 1 is realized by the first through hole 21 and the embedding hole 12, and the eccentric block 2 drives the second through hole 22 to realize the eccentric movement of the second through hole 22 with respect to the axis of the gear block 1; separately moulding and embedding the gear block 1 and the eccentric block 2, which is different from the two-casting process in the prior art, can ensure the quality process of each accessory, and installation of the gear block 1 and the eccentric block 2 is more convenient than that obtained from the two-casting process, which ensures the quality of the eccentric gear structure.

The eccentric block 2 has a fan-like shape, the axis of the first through hole 21 coincides with an axis of a central angle of the eccentric block 2, and the second through hole 22 is disposed on a position away from an arc surface of the fan-like shape, which achieves the eccentric movement of the second through hole 22 embedded into the accommodating cavity 11, and makes the structure of the eccentric block 2 more stable.

The eccentric block 2 is fixed in the accommodating cavity 11 by rivets 4, so that the fixing of the eccentric block 2 in the accommodating cavity 11 is realized by the rivets 4.

The accommodating cavity 11 has a depth of 6 to 7 mm, and the thickness of the eccentric block 2 is 2 to 3 mm greater than the depth of the accommodating cavity 11, which ensures the stability of the eccentric gear structure.

A side of the embedding hole 12 away from the accommodating cavity 11 is provided with a boss 3, and a side of the second through hole 22 away from the accommodating cavity 11 is provided with a boss 3. The rotating shaft is wrapped by the boss 3 to ensure the stability of the rotating shaft after embedding.

A distance between the axis of the first through hole 21 and an axis of the second through hole 22 is in a range of 7 to 9 mm, which ensures the structure stability of the gear block 1.

The gear block 1 is made of plastic, so that it is easy to be processed.

A contour of the accommodating cavity 11 is the same as an outer contour of the eccentric block 2, so that the embedded tightness of the eccentric block 2 and the gear block 1 is improved.

In the description of the application, it should be noted that, orientation or positional relationships indicated by the terms "center", "longitudinal", "lateral", "upper", "lower", "front", "back", "left", "right" "vertical", "horizontal", "top", "bottom", "inside", "outside", and the like are based on orientation or positional relationships shown in the drawings, which are only for conveniently describing the application and simplifying the description, rather than indicating or implying that the referred device or component must have a specific orientation, or be constructed and operated in a specific orientation, such that these terms cannot be understood as limitation of the application. In addition, the terms "first" and "second" as used herein are used only for purposes of describing, and cannot be understood as indicating or implying relative location.

In the description of the application, it should be noted that the terms "install/installation", "connect/connected", and "link/linked" are to be understood broadly, and may be, for example, a fixed connection, a detachable connection, or an integral connection; or it may be a mechanical connection or an electrical connection; or it may be a direct connection or an indirect connection through an intermediate medium; or it may be internal communication between two elements. The specific meanings of the above terms in the application can be understood by those skilled in the art in a specific case.

Further, in the description of the application, "a plurality of" or "multiple" means two or more unless otherwise stated.

The above description is only preferred embodiments of the application, and it should be noted that those skilled in the art can make several improvements and substitutions without departing from the technical principles of the application, which improvements and substitutions are also considered to be the scope of protection of the application.

What is claimed is:

1. An eccentric gear structure, wherein the eccentric gear structure comprises a gear block and an eccentric block embedded into the gear block, the gear block is provided with an accommodating cavity suitable for embedment of the eccentric block, the eccentric block is provided with a first through hole and a second through hole that deviates from the first through hole, an embedding hole is provided at an axis of the gear block, and an axis of the first through hole coincides with an axis of the embedding hole, a side of the embedding hole away from the accommodating cavity is provided with a boss, and a distance between the axis of the first through hole and an axis of the second through hole is in a range of 7 to 9 mm.

2. The eccentric gear structure of claim 1, wherein the eccentric block has a fan-like shape, the axis of the first through hole coincides with an axis of a central angle of the eccentric block, and the second through hole is disposed on a position away from an arc surface of the fan-like shape.

3. The eccentric gear structure of claim 1, wherein the eccentric block is fixed within the accommodating cavity by rivets.

4. The eccentric gear structure of claim 1, wherein the accommodating cavity has a depth of 6 to 7 mm.

5. The eccentric gear structure of claim 4, wherein a thickness of the eccentric block is 2 to 3 mm greater than the depth of the accommodating cavity.

6. The eccentric gear structure of claim 1, wherein a side of the second through hole away from the accommodating cavity is provided with a boss.

7. The eccentric gear structure of claim 1, wherein the gear block is made of plastic.

8. The eccentric gear structure of claim 1, wherein a contour of the accommodating cavity is the same as an outer contour of the eccentric block.

* * * * *